UNITED STATES PATENT OFFICE.

JEHU BRAINERD, OF CLEVELAND, OHIO, ASSIGNOR TO BRAINERD & BURRIDGE, OF SAME PLACE.

IMPROVEMENT IN TANNING.

Specification forming part of Letters Patent No. 34,609, dated March 4, 1862.

*To all whom it may concern:*

Be it known that I, JEHU BRAINERD, of Cleveland, in the county of Cuyahoga and State of Ohio, have invented new and useful Improvements in Tanning; and I do hereby declare that the following is a full and complete description thereof.

The nature of my improvement relates to the preparation and use of the bark and leaves of a certain species of willow known and described as *Salix grisea* of Willd, *S. petiolaris* of Lind, *S. fuscata* of Pursh, without which preparation this species is not to any desirable extent available for the purpose of tanning. I do not pretend to have made the discovery that this species of willow contains tannin; but I do claim to have discovered that the hereinafter-described preparation of the bark and leaves is essential to its profitable employment for purposes of tanning for reasons which I will presently state. I will, however, first remark that my mode of preparation of the *Salix grisea* differs from that employed in preparing other shrubs, as sumac or herbaceous plants which contain tannin, which are cut and simply dried without separating the woody fiber of the stalk from the bark and leaves.

The best time for gathering the *Salix grisea* is during the summer and early part of autumn, say from June to October; but if it is cut and suffered to wilt and dry in its natural state, the bark and leaves change from their natural color to a dark brown or black, and the wood itself, which is very white when first cut, becomes dark-colored also. The bark and leaves to a great extent lose their astringent properties both by absorption into the wood and the decomposition of the tannin which they contain, and, besides, a decoction from the shrub in this condition gives skins immersed in it a dark and dirty color, without producing to any desirable extent their conversion into leather.

My mode of preparation is as follows: When the shrub (*Salix grisea*) is first cut and while still fresh and green I crush it between hard rollers or otherwise, and immediately separate the wood from the bark and leaves. I then dry the bark and leaves as quickly as possible, either by artificial heat or in the open air; but quick drying is essential to the preservation of all the important properties of the shrub when not immediately used, as hereinafter stated. When thus dried I put the bark and leaves into packages or bales, pressed like bales of hay; or the bark and leaves may be ground together in a mill and put up in sacks for future use. In either case it may be preserved for any length of time if kept dry, and is in a convenient form for transportation. For use the ground state is the best, for it more readily yields its strength in making a decoction. From the bark and leaves thus prepared I make a decoction in which, when cold, I immerse the skins or hides to be tanned; or in situations where the shrub can be obtained fresh the wood may be separated from the bark and leaves, as hereinbefore stated, and a decoction made without the process of previous drying. In either case skins tanned in this decoction possess a remarkably soft texture and a fair and beautiful color. This decoction may be used alone or mixed with tannin prepared from other substances.

The shrub can be cut, crushed, and used in the winter season; but in this case, as the bark is not easily separable from the wood, a considerable amount of tannin is absorbed by the wood in making the decoction, as is shown by the astringent taste and change of color of the wood.

What I claim as my improvement, and desire to secure by Letters Patent, is—

The use of the *Salix grisea* for the purpose of tanning, when prepared as herein set forth.

JEHU BRAINERD.

Witnesses:
EDM. F. BROWN,
T. T. EVERETT.